United States Patent [19]

Yoshioka

[11] Patent Number: 4,770,263

[45] Date of Patent: Sep. 13, 1988

[54] BODY CONSTUCTION OF INDUSTRIAL VEHICLE

[75] Inventor: Sousuke Yoshioka, Tama, Japan

[73] Assignee: Nissan Motor Co., Ltd., Yokohama, Japan

[21] Appl. No.: 943,753

[22] Filed: Dec. 19, 1986

[30] Foreign Application Priority Data

Dec. 25, 1985 [JP] Japan .................................. 60-290451
Dec. 25, 1985 [JP] Japan .................................. 60-290452
Jan. 14, 1986 [JP] Japan .................................. 61-3418[U]

[51] Int. Cl.$^4$ .............................................. B62D 25/10
[52] U.S. Cl. ................................ 180/89.17; 180/69.24; 296/196
[58] Field of Search ............... 180/89.17, 89.18, 69.24, 180/69.21; 296/191, 194, 196, 197

[56] References Cited

U.S. PATENT DOCUMENTS

| 1,343,519 | 6/1920 | Motte ................................. | 180/69.24 |
| 3,261,422 | 7/1966 | Jensen .............................. | 180/89.17 |
| 4,572,312 | 2/1986 | France et al. ..................... | 180/69.21 |

FOREIGN PATENT DOCUMENTS 53-47207 4/1978 Japan .
58-30575 2/1983 Japan .

Primary Examiner—Kenneth R. Rice
Attorney, Agent, or Firm—Lowe, Price, LeBlanc, Becker & Shur

[57] ABSTRACT

A construction forming a part of a body of an industrial vehicle is composed of a frame structure and a covering of an engine compartment. The covering has a hinged upper panel, and left and right side panels each of which is hinged at a bottom end so that an upper end of each side panel is swingable outwardly.

18 Claims, 8 Drawing Sheets

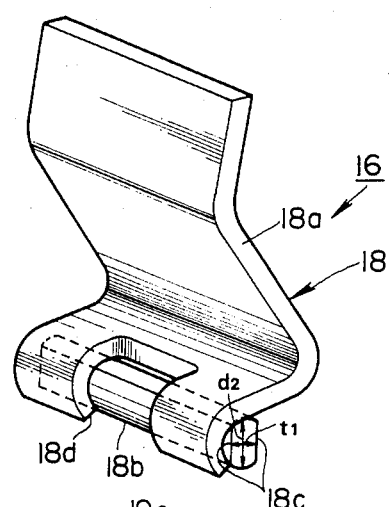
FIG.2
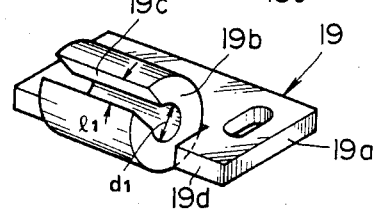
FIG.3
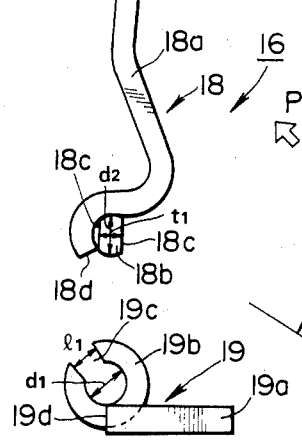
FIG.4
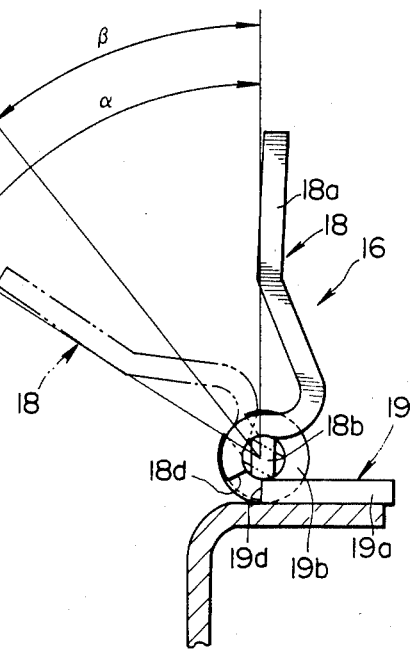

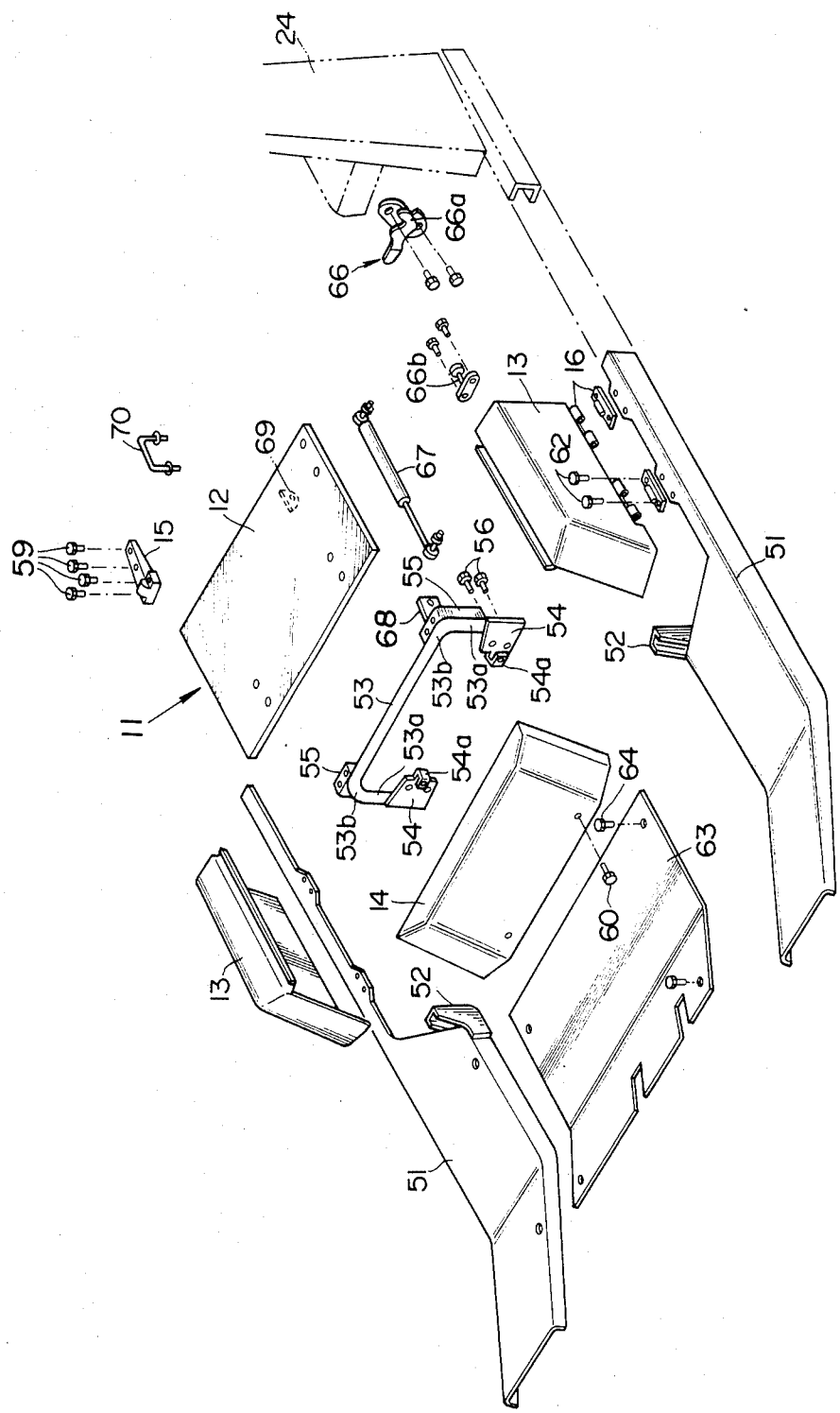

BODY CONSTUCTION OF INDUSTRIAL VEHICLE

BACKGROUND OF THE INVENTION

The present invention relates to a body construction of an industrial vehicle such as a forklift, and more specifically to an openable covering of the engine compartment and a frame structure of a cabin.

One conventional example of an industrial vehicle body construction is shown in FIG. 17. In this construction, a covering 2 of an engine compartment 1 is composed of an upper panel 3, left and right side panels 4, and a front panel 5. A rear end 3a of the upper panel 3 is hinged so that the upper panel 3 is swingable up and down on a horizontal axis. A rear end of at least one side panel 4 is supported through hinges 6 so that the side panel 4 is swingable outwardly on a vertical axis. A front end 4b of the swingable side panel 4 is provided with a striker 8 which can engage with a lock 7 provided in the front panel 5. The covering 2 openable in this way is convenient for inspection and maintenance of the engine in the engine compartment. A similar construction is disclosed in Japanese Utility Model provisional publication No. 58-30575.

However, the conventional construction of FIG. 17 is disadvantageous in the following points. When the side panel is open, the side panel is supported only at one end like a cantilever. Therefore, the hinges 6 must be strong enough to endure a moment of force of a considerable magnitude. It is difficult to reach a corner A near the hinges 6. When the side panel 4 is opened, the side panel 4 projects outwardly over a long distance. Therefore, the side panel 4 in the open position is very obstructive, and the side panel 4 cannot be opened in a narrow space. In the closed state, a great moment due to a vertical load is applied on the side panel 4 because the side panel 4 is supported at front and rear ends spaced along the longest dimension of the side panel, by the hinges 6 and the lock 7. Therefore, the side panel 4 must be sufficiently rigid. Because an axis of the hinges 6 must be substantially vertical, restraint is imposed on design of the counterweight or the like to which the hinges 6 are attached. It is difficult to seal a clearance between the lower end 4c of the side panel 4 and the vehicle body 9 with a seal rubber for soundproofing and waterproofing because too much friction is applied on the seal rubber. Furthermore, because both of the upper panel 3 and the side panel 4 are locked and unlocked individually, the opening and closing operations of the covering 2 are troublesome. The striker 8 and the lock 7 for locking the side panel 4 are complicated in construction.

Another conventional example of an industrial vehicle is disclosed in Japanese Utility Model provisional publication No. 53-47207. In this example, a cabin is mounted on a chassis frame through a plurality of cushioning members in order to insulate the cabin from vibrations transmitted from a power unit or road wheels through the chassis frame to which the power unit and an axle member are rigidly connected. In this vehicle body, however, a floor panel is fixedly mounted on a front portion of the frame so that the power train is covered by the floor panel which can not be opened.

SUMMARY OF THE INVENTION

It is an object of the present invention to provide an industrial vehicle body construction arranged to overcome the above-mentioned problems of the conventional constructions.

According to the present invention, a construction for forming a body of an industrial vehicle comprises a stationary frame structure, an upper panel serving as a top cover of a machine compartment such as an engine compartment, and a first side panel serving as a left or right side wall of the machine compartment. The upper panel is swingably mounted on the stationary frame structure through upper hinge means. The side panel is swingably mounted on the frame structure through first side hinge means which comprises at least one pair of a stationary leaf fixed to the stationary frame structure and a swingable leaf fixed to a bottom end of the side panel.

BRIEF DESCRIPTION OF THE DRAWINGS

FIG. 2 is an exploded perspective view of one of side hinges of the first embodiment, FIG. 3 is a side view of the side hinge of FIG. 2 in the exploded state, FIG. 4 is a side view of the side hinge of FIG. 2 in the assembled state.

FIG. 16 is an exploded perspective view showing a third embodiment of the present invention.

DETAILED DESCRIPTION OF THE INVENTION

A first embodiment of the present invention is shown in FIGS. 1-8.

An engine compartment E of an industrial vehicle is covered by a covering 11 which is composed of an upper panel 12 serving as a top wall of the engine compartment E, a pair of left and right side panels 13 serving as side walls of the compartment E, and a front panel 14.

Figure 8:
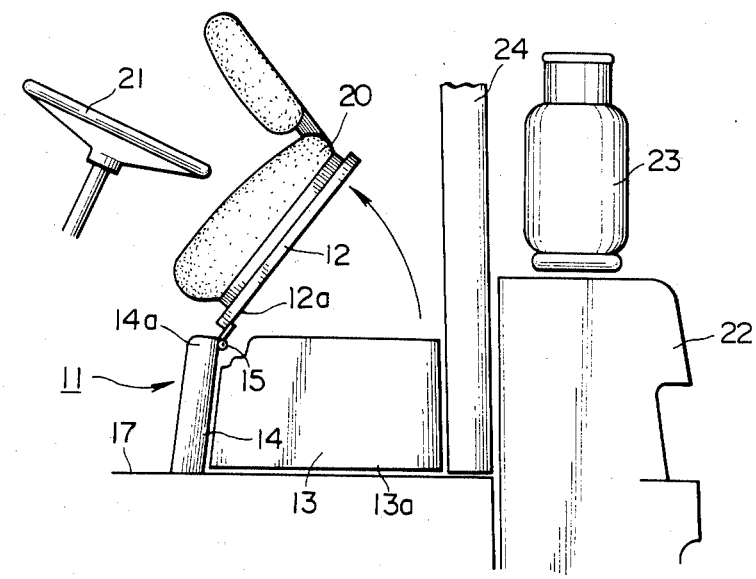
FIG. 8 is a side view of the industrial vehicle of the first embodiment.

The upper panel 12 is approximately rectangular. As shown in FIG. 8, a front end 12a of the upper panel 12 is attached to an upper end 14a of the front panel 14 through one or more upper hinges 15. Accordingly, the upper panel 12 is swingable on an axis of said upper hinges 15.

A lower end 13a of each side panel 13 is attached to a vehicle body 17 through one or more side hinges 16 in such a manner that each side panel 13 is swingable on an axis of the side hinges 16, and capable of being disconnected from the vehicle body 17. In this embodiment, each side panel 13 is provided with the two side hinges 16.

Each side hinge 16 is composed of a swingable leaf 18 fixed to the lower end 13a of the side panel 13, and a stationary leaf 19 fixed to the vehicle body 17, as shown in FIGS. 2-4.

The stationary leaf 19 of each side hinge 16 has a flat portion 19a fixed to the vehicle body 17, and a tubular portion 19b of a hollow cylindrical shape, fixedly supported by the flat portion 19a. The swingable leaf 18 of each side hinge 16 has a plate portion 18a fixed to the side panel 13, and a rod portion 18b joined to the plate portion 18a by welding.

The tubular portion 19b of the stationary leaf 19 of each side hinge 16 has a cylindrical interior cavity having an inside diameter $d_1$, and a slit 19c having a width $l_1$. The slit extends along an axis of the cylindrical cavity from end to end of the tubular portion 19b, and is bounded between two parallel flat surfaces which are at a distance of $l_1$ apart from each other and which are substantially symmetrical with respect to a plane including the axis of the cylindrical cavity. Therefore, the tubular portion 19b has a C-shaped cross section.

The rod portion 18b of the swingable leaf 18 of each side hinge 16 is generally in the shape of a cylinder having a diameter of $d_2$ less than than the inside diameter $d_1$ of the cylindrical cavity of the tubular portion 19b of the stationary leaf 19. The rod portion 18b is formed with two parallel side surfaces 18c by cutting off both sides of the rod portion 18b. The side surfaces 18c of the rod portion 18b are substantially symmetrical with respect to a plane including an axis of the cylindrical shape of the rod portion. A thickness $t_1$ between the two side surfaces 18c is smaller than the width $l_1$ of the slit 19c of the tubular portion 19b.

In the state in which the rod portion 18b is fit in the cylindrical cavity of the tubular portion 19b, the swingable leaf 18 is rotatably supported by the stationary leaf 19. As shown in FIG. 4, the swingable leaf 18 is swingable between an upright position shown by a solid line and an open position shown by a two dot chain line. An angle between the upright position and the open position is α (alpha). At the open position, a lower end 18d of the plate portion 18a of the swingable leaf 18 abuts on an outboard end 19d of the flat portion 19a of the stationary leaf 19. In this way, the flat portion 19a of the stationary leaf 19 limits the rotational movement of the swingable leaf 18. The swingable leaf 18 can be disconnected from the stationary leaf 19 by extracting the rod portion 18b radially through the slit 19c when the swingable leaf 18 is at a position which makes an angle β (beta) with the upright position and which is situated between the upright position and the open position.

As shown in FIG. 8, the industrial vehicle further has a seat 20 mounted on the upper panel 12. a steering wheel 21, a counterweight 22,. a LPG container 23, and rear pillars 24 of an overhead protective structure.

Figure 1:
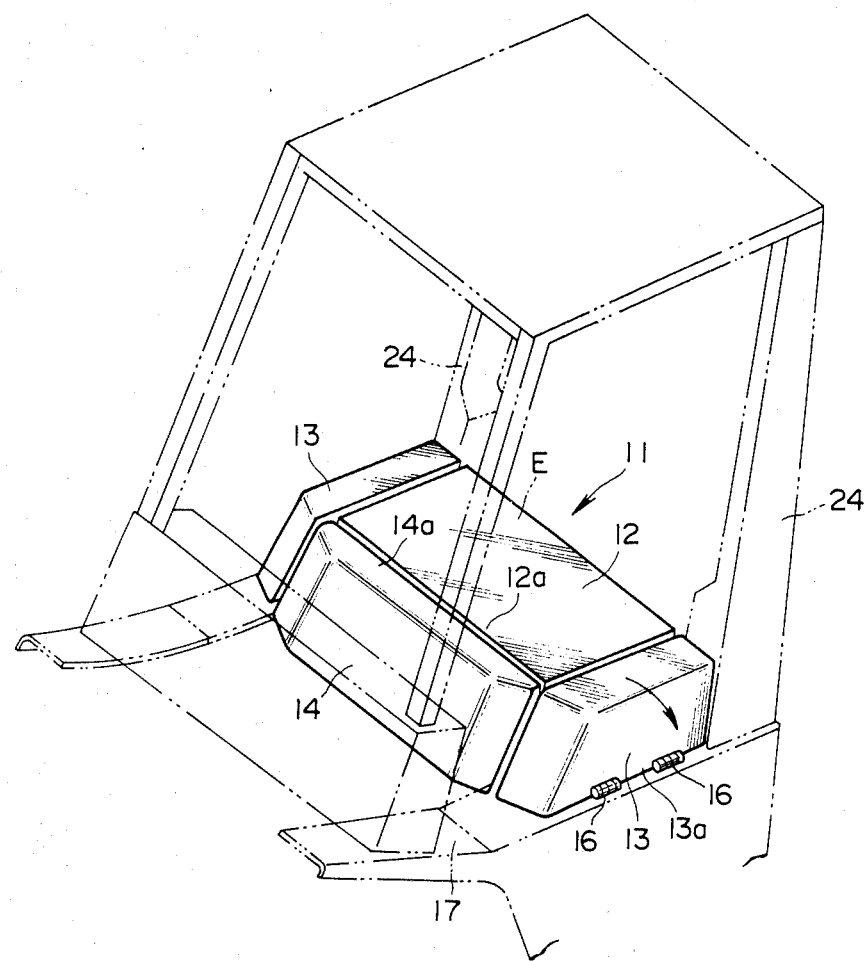
FIG. 1 is a perspective view of a part of an industrial vehicle showing a first embodiment of the present invention.
Figure 5:
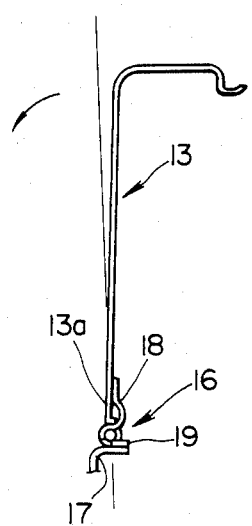
FIGS. 5-7 are views showing a side panel of the first embodiment, respectively, in an upright position, an open position and a detachable position.
Figure 6:
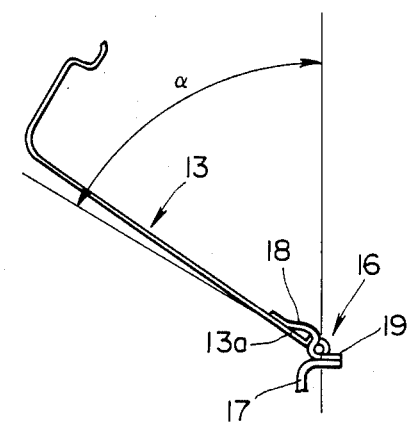
Figure 7:
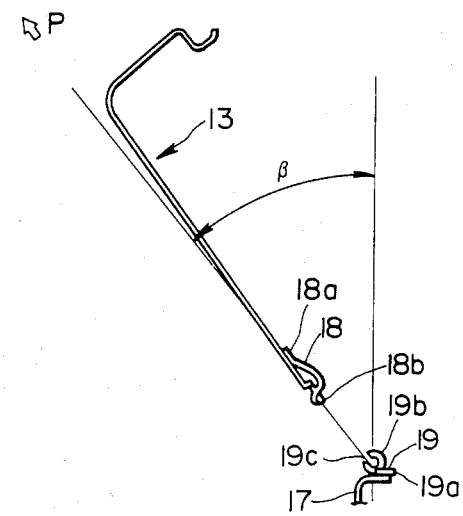

The construction of the first embodiment is operated as follows:

To inspect the engine enclosed within the compartment E, the side panel 13 is rotated on the side hinges 16 outwardly through the angle α from the upright position shown in FIG. 5 to the open position shown in FIG. 6. The side panel 13 is kept at the open position by the abutment in each side hinge 16 between the outboard end 19d of the flat portion 19a of the stationary leaf 19 and the lower end 18d of the plate portion 18a of the swingable leaf 18 as shown by two dot chain line in FIG. 4. Therefore, it is easy to inspect the engine.

Figure 17:
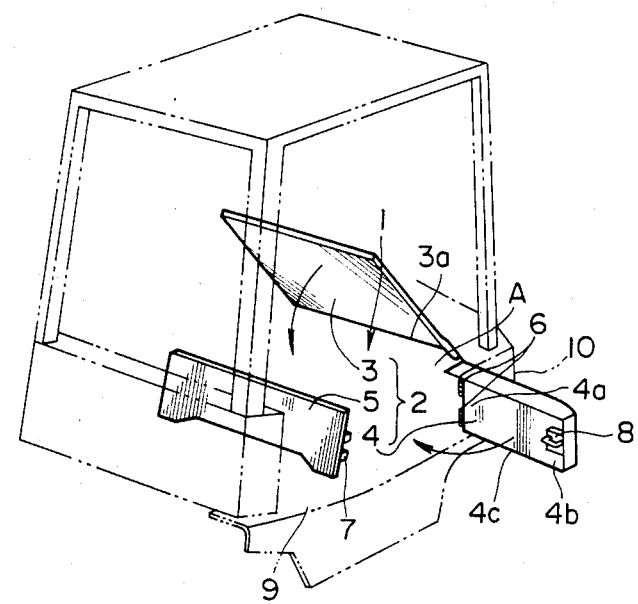
FIG. 17 is a perspective view showing a conventional example of an industrial vehicle body.

In this construction, each side panel i3 is swingable on the side hinges 16 attached to the lower end 13a of the side panel 13 which is the lowest part of the side panel 13 when the side panel 13 is placed in the upright position. (1) Therefore, each side hinge 16 is not subject to a rotation moment of such a large magnitude as in the conventional construction shown in FIG. 17, and each side hinge 16 need not be so strong. (2) Furthermore, the amount of projection of each side panel 13 in the open position is smaller than that of the conventional construction. Therefore, it is possible to open the side panel 13 even in a very narrow space. (3) When the side panel 13 is in the open position, the side of the engine compartment E is made easily accessible over the full length from the front end to the rear end. (4) The side hinges 16 are mounted on the vehicle body 17, not on the counterweight 21. Therefore, no restraint is imposed on the design of the counterweight or the like. (5) In the closed position, the side panel 13 is supported not at the front and rear ends but at the bottom end. Therefore, a load vertically applied on the side panel produces a moment of force of a smaller magnitude, so that the side panel 13 need not be so rigid. (6) The clearance between the bottom end 13a of the side panel and the vehicle body 17 can be easily sealed.

In the case of a large scale maintenance or replacement of a battery or a unit of an air cleaner, the upper panel 12 is rotated on the upper hinges 15, and either or both of the side panels 13 is removed from the vehicle body 17. It is possible to remove the side panel 13 by rotating the side panel 13 outwardly through the angle β from the upright position, and pulling the side panel 13 in a direction shown by an arrow P in FIGS. 4 and 7. In this way, the engine maintenance service is made very easy by the wide opening of the engine compartment E, and the removal of the side panel 13.

A second embodiment of the present invention is shown in FIGS. 9–15.

The construction of the second embodiment has a covering 11 of an engine compartment E. The covering 11 is composed of an upper panel 12, left and right side panels 13, and a front panel 14. The upper panel 12 is approximately rectangular. A front end 12a of the upper panel 12 is swingably supported on a top end 14a of the front panel 14 through one or more upper hinges 16. A bottom end 13a of each side panel 13 is swingably mounted on a vehicle body 17 through two side hinges 16, so that an upper end of each side panel 13 is swingable outwardly.

Figure 12:
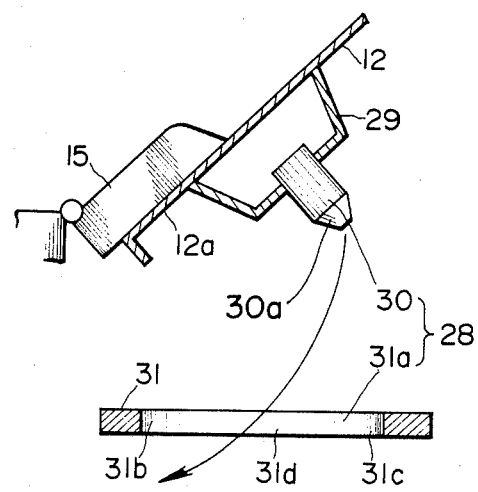
FIG. 12 is an enlarged view of a part enclosed by a circle in FIG. 11.

There is further provided left and right locks 28 for locking the left and right side panels 13, respectively, in the upright closed position. As shown in FIG. 12, each lock 28 has a lock pin 30 which is fixed through a bracket 29 to a front, left-hand or right-hand corner of the lower surface of the upper panel 12. The left and right lock pins 30 project downwardly, respectively, from both of the front corners of the upper panel 12. A lower end 20a of each lock pin 30 is tapered. A lock plate 31 is fixed to each side panel 13 at a position near both of the front end 13b and the upper end of the side panel 13. The lock plate 31 projects from each side panel 13 inwardly toward the center of the vehicle.

Figure 13:
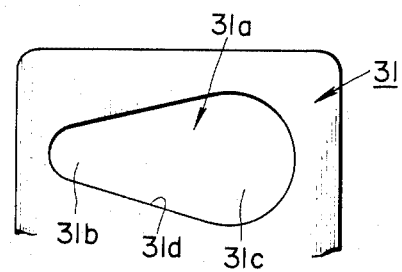
FIG. 13 is a plane view of a lock plate shown in FIG. 12.
Figure 14:
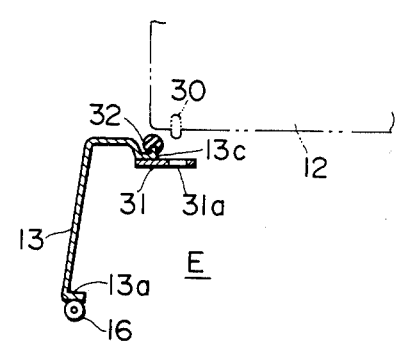
FIG. 14 is a sectional view taken on line XIV—XIV of FIG. 9.

Each lock plate 31 is formed with a lock hole 31a for engaging with the mating lock pin 30. As shown in FIG. 13, the lock hole 31a is elongated, and has a front portion 31b and a rear portion 31c. The lock hole 31a of each lock plate 31 is tapered so that the width of the lock hole 31a becomes gradually smaller from the rear portion 31c to the front portion 31b.

Figure 15:
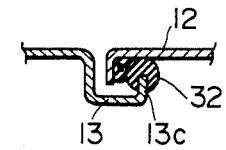
FIG. 15 is a sectional view taken on line XV—XV of FIG. 10.

As shown in FIG. 15, the upper end of each side panel 13 is bent to form an upper flange 13c to which a seal rubber 32 is attached. The upper panel 12 rests on the seal rubbers 32 of the left and right side panels 13 when the panels are closed.

The construction of the second embodiment is operated as follows:

The covering 11 of the engine compartment E can be opened by first rotating the upper panel 12 on the upper hinges 15. With this rotational movement, the left and right lock pins 30 fixed to the upper panel 12 move away from the lock holes 31a of the left and right lock plate 31, respectively. Therefore, both side panels 13 are unlocked. Thereafter, each side panel 13 is rotated on the side hinges 16 outwardly as shown by an arrow in FIG. 9. In this way, the covering 11 can be opened easily with no need for any special operation for unlocking the side panels.

Figure 9:
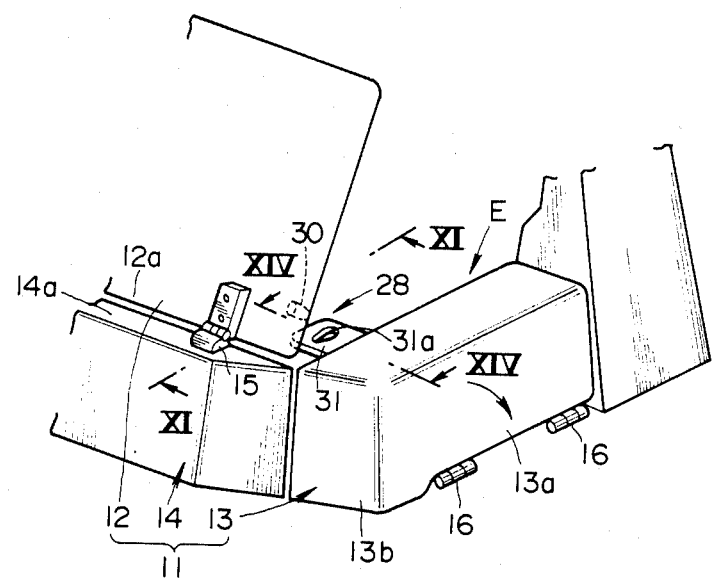
FIG. 9 is a perspective view of a covering of an engine compartment of an industrial vehicle showing a second embodiment of the present invention.
Figure 10:
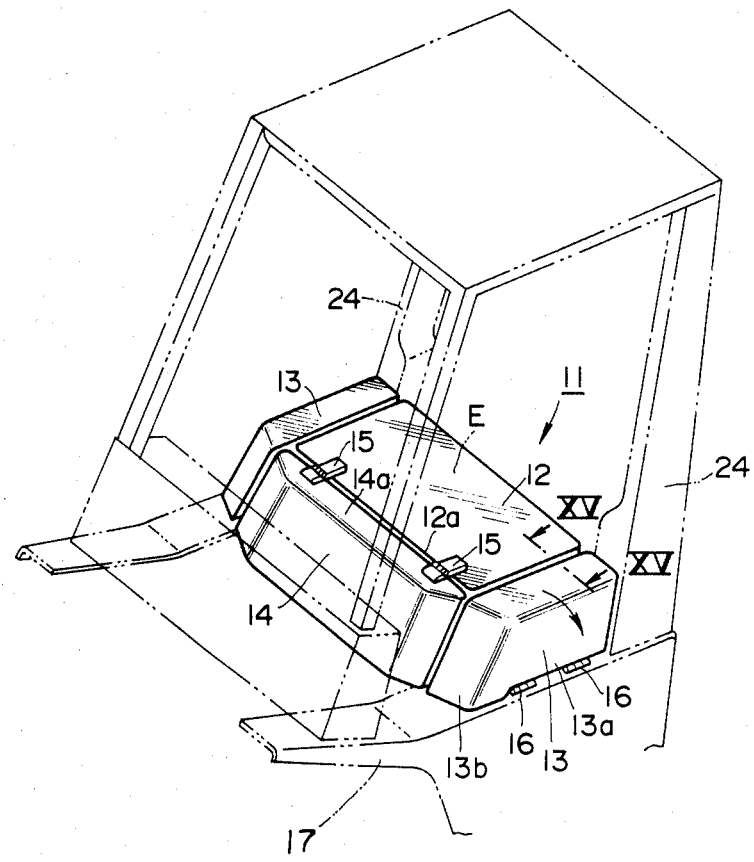
FIG. 10 is a perspective view of a part of the industrial vehicle of the second embodiment.
Figure 11:
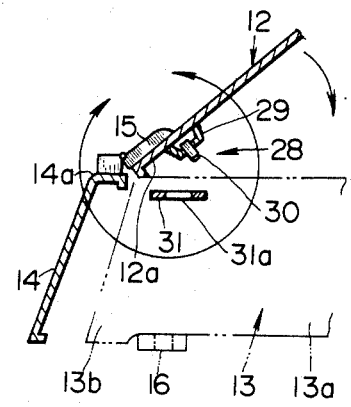
FIG. 11 is a sectional view taken on line X1—X1 of FIG. 9.

The covering 11 can be closed by first rotating the side panels 13 to the upright position, and then rotating the upper panel 12, from the open position shown in FIGS. 9, 11 and 12, in a downward direction as shown by arrows. With this rotational movement of the upper panel 12, the left and right lock pins 30 move into the lock holes 31a of the left and right lock plates 31, respectively, and therefore the side panels 13 are locked.

In this case, each lock pin 30 rotates about an axis of the upper hinges 15 together with the upper panel 12, and first enters the wide rear portion 31c of the lock hole 31a. In this state, each lock pin 30 is loosely received in the lock hole 31a. Each lock pin 30 can enter the lock hole 31a very easily because each lock pin 30 is formed with the tapered portion 30a, and each lock hole 31a is formed with the wide rear portion 31c. Thereafter, each lock pin 30 moves toward the narrow front portion 31b of the lock hole 31a as the upper panel 12 is further rotated downwardly. Even if the side panel 13 is not placed exactly at the correct upright position, the lock pin 30 can bring the side panel 13 to the correct position by sliding on one of side walls 31d of the lock hole 31a while moving from the rear portion 31c to the front portion 31b. When the upper panel 12 reaches the fully closed position, each lock pin 30 reaches the narrow front portion 31b of the lock hole 31a. In this state, each lock pin 30 is firmly engaged with the narrow portion 31b of the lock hole 31a, so that the side panel 13 is firmly locked. The upper panel 12 is supported on the elastic seal rubbers 22. In this way, the covering 11 can be closed very easily.

According to the second embodiment, the covering 11 can be opened and closed easily, and the locks 28 are very simple in construction. In the second embodiment, each lock 28 is disposed near the upper hinge 15. Therefore, it is easy to position the lock pin 30 and the lock hole 31a correctly. It is possible to use the locks 28 of the second embodiment in the arrangement in which the rear ends of the side panels are hinged so that each side panel is swingable on a vertical axis.

A third embodiment of the present invention is shown in FIG. 16.

A construction of the third embodiment for forming a body of an industrial vehicle has a left and right pair of cab frame side members 51, and a cross member 53.

Each cab frame side member 51 has a bracket 52 projecting upwardly at an intermediate position situated between front and rear end of the side member 51 on the inboard side. The cross member 53 is U-shaped. The cross member 53 has an upper portion extending along the lateral axis of the vehicle, and left and right legs 53a which extend downwardly from both ends of the upper portion. A bracket 54 is fixed to a lower end of each leg 53a of the cross member 53. The bracket 54 of each leg 53a front of the vehicle, and is bent in the shape of the letter L. Left and right hinge seats 53 are fixed. respectively, to left and right shoulders 53b which are bent portions of the cross member 53 between the upper portion and the left or right leg 53a. The left leg 53a of the cross member 53 is fixed to the left side member 51 through the left brackets 52 and 54 by means of bolts and nuts 56. The right leg 53a of the cross member 53 is fixed to the right side member 51 in the same manner.

The construction of the third embodiment further has a covering 11 which is composed of an upper panel 12, left and right side panels 13, and a front panel 14. The upper panel 12 is swingably supported on the cross member 53 through left and right upper hinges 15. The upper hinges 15 are attached to a front end of the upper panel by means of bolts and nuts 59 on one hand, and to the hinge seats 55, respectively, by means of bolts and nuts 59 on the other hand. A lower end of the front panel 14 is fixed to the front portions 54a of the left and right brackets 54 of the cross member 53 by means of bolts and nuts 60. The cross member 55 is covered by the front panel 14. Each side panel 13 is swingably mounted on the side member 51 through two side hinges 16. Each side hinge 16 is attached to a lower end of the side panel 13 and the side member 51 by means of bolts and nuts 62. Each side panel 13 is swingable outwardly about an axis substantially parallel to the longitudinal axis of the vehicle. Each side panel 13 is provided with a lock 66 which has a striker 66b fixed to a rear end of the side panel 13, and a latch 66a mounted on a rear pillar 24.

A floor panel 63 is fixed in a non-permanent manner to front portions of the left and right side members 51 by means of bolts and nuts 64. The left and right sides of the floor panel 63 are fixedly supported on the left and right side members 51, respectively. A gas stay 67 extends from a bracket 68 projecting rearwardly from one of the hinge seats 55 of the cross member 53, to a bracket 69 projecting downwardly from a rear end of the upper panel 12. A handle 70 is fixed to the upper panel 12.

The cab frame of FIG. 16 composed of the left and right side members 51 connected by the cross member 53 is mounted on a chassis frame through insulators for keeping the vibration from entering the cab frame.

In the construction of the third embodiment, the left and right cab frame side members 51 are rigidly connected by the cross member 53 of the shape of the inverted letter U. Furthermore, the upper panel 12 and the front panel 14 are connected to the cross member 53. Therefore a twisting force applied on the cabin is received not only by the cross member 53 but also by the covering 11. The covering 11 of the third embodiment can serve as a reinforcement for reinforcing the torsional rigidity of the cross member 53. Usually a power train is disposed between the left and right side members 51 in such a manner that the power train projects high between the side members 51. However, the cross member 53 of the inverted U shape can be fixed to the middle portions of the side members 51, so that the torsional rigidity of the cabin can be increased efficiently. Furthermore, because the middle portions of the side members 51 are connected by the cross member 55 of the inverted U shape, the floor panel 63 can be mounted on the front portions of the side members 51 in a such a manner that the floor panel 63 can be easily removed to facilitate maintenance service of the power train under the floor panel 63.

In the third embodiment, the upper panel and the side panels are openable independently. However, the frame structure of the third embodiment can be combined with the covering in which an upper panel and side panels are openable as an integral unit.

What is claimed is:

1. A construction for forming a body of an industrial vehicle, comprising:
    a stationary frame structure,
    an upper panel serving as a top cover for an upper opening of a machine compartment of the vehicle, said upper panel being swingably mounted on said stationary frame structure through upper hinge means,
    a first side panel serving as a side wall of the machine compartment, said panel being swingably mounted on said stationary frame structure through first side hinge means which comprises at least one pair of a stationary leaf fixed to said stationary frame structure and a swingable leaf fixed to a bottom end of said side panel, said first side panel having a swingable upper end having an edge lying adjacent said upper panel defining a border of said upper opening.

2. A construction according to claim 1 wherein said swingable leaf is detachably connected with said stationary leaf.

3. A construction according to claim 2 wherein said side panel swings on a first side hinge axis which is substantially parallel to a longitudinal axis of the vehicle, and said upper panel swings on an upper hinge axis which is substantially parallel to a lateral axis of the vehicle.

4. A construction according to claim 3 wherein said bottom end of said side panel extends substantially parallel to a longitudinal axis of the vehicle, and said side panel further has an upper end extending substantially parallel to said bottom end, and front and rear ends extending between said bottom and upper ends so as to form a substantially rectangular shape, a distance between said front end and said rear end being longer than a distance between said uppe end and said bottom end.

5. A construction according to claim 3 wherein said side panel swings on said first side hinge axis between an upright position in which said side panel is substantially parallel to a vertical axis of said vehicle, and an open position in which said upper end of said side panel is situated more outboard than in said upright position, said swingable leaf being detachable from said stationary leaf when said side panel is in a detachable position intermediate between said upright and open positions.

6. A construction according to claim 5 wherein said stationary leaf has a tubular portion having a cylindrical cavity, and a slit bounded between two parallel planes which are parallel to and equidistant from an axis of said cylindrical cavity, and said swingable leaf has a rod portion having a cylindrical shape but having two parallel flat side surfaces which are parallel to and equidistant from an axis of the cylindrical shape, and spaced from each other at a distance shorter than a diameter of the cylindrical shape, said rod portion being capable of being rotatably fit in said cylindrical cavity of said tubular portion, and capable of passing through said slit only when said flat side surfaces of said rod portion are substantially parallel to the two parallel planes bounding said slit.

7. A construction according to claim 6 wherein said stationary leaf further has a flat portion for fixing said tubular portion to said stationary frame structure, and said swingable leaf has a plate portion which is fixed to said side panel and has two arms gripping both ends of said rod portion, ends of said arms of said plate portion abutting against an end of said flat portion of said stationary leaf to limit a swing movement of said side panel when said side panel is in said open position.

8. A construction according to claim 7 wherein said frame structure comprises a front panel serving as a front wall of the machine compartment, said upper panel being swingably mounted on an upper end of said front panel, said construction further comprising a second side panel swingably mounted on said stationary frame structure so that said first and second side panels are arranged in a manner of a bilateral symmetry.

9. A construction for forming a body of an industrial vehicle, comprising:
    a stationary frame structure,
    an upper panel serving as a top cover of a machine compartment of the vehicle, said upper panel being swingably mounted on said stationary frame structure through upper hinge means,
    a first side panel serving as a side wall of the machine compartment, said side panel being swingably mounted on said stationary frame structure through first side hinge means which comprises at least one pair of a stationary leaf fixed to said stationary frame structure and a swingable leaf fixed to a bottom end of said side panel wherein said first side panel comprises a receiving portion, and said upper panel comprises a first locking portion which engages with said receiving portion of said first side panel in such a manner as to lock said first side panel when said upper panel is closed in a state in which said first side panel is closed.

10. A construction according to claim 9 wherein said first locking portion of said upper panel has a lock pin projecting downwardly from said upper panel and having a tapered end, and said receiving portion of said side panel has a lock hole for receiving said lock pin said lock hole having a wide portion and a narrow portion which is closer to an upper hinge axis on which said upper panel swings, said lock hole being shaped in such a manner that a width of said lock hole becomes gradually smaller from said wide portion to said narrow portion, and positioned in such a manner that said lock pin of said upper panel first enters said wide portion of said lock hole, and then moves to said narrow portion when said upper panel is rotated to a closed position.

11. A construction according to claim 10 wherein said lock pin is situated near said upper hinge axis.

12. A construction according to claim 11 wherein said upper panel is substantially rectangular, and has front and rear ends extending substantially in parallel to said upper hinge axis which is substantially parallel to a lateral axis of the vehicle, and situated closer to said front end than to said rear end, said lock pin being closer to said upper hinge axis than a middle point between said front and rear ends, a first side hinge axis on which said first side panel swings being substantially parallel to a longitudinal axis of the vehicle.

13. A construction according to claim 12 wherein a rubber is mounted on an upper end of said first side panel so that said upper panel can rest on said rubber when said upper panel is in the closed position.

14. A construction according to claim 1 wherein said stationary frame structure comprises a cross member having an upper portion extending substantially in parallel to a lateral axis of the vehicle and supporting said upper panel, and left and right legs extending downwardly, respectively, from left and right ends of said upper portion, left and right cab frame members which extend substantially in parallel to a longitudinal axis of the vehicle and are rigidly connected, respectively, with lower ends of said left and right legs of said cross member, and a front panel which serves as a front wall of said machine compartment connected to said cross member.

15. A construction according to claim 14 wherein each of said cab frame members has a front portion, a rear portion and a middle portion lying between said front and rear portions, said cross member being fixed to said middle portions of said left and right cab frame members, said construction further comprising a second side panel serving as a side wall of said machine compartment, said first and second side panels being mounted, respectively, on said rear portions of said cab frame members, said stationary frame structure further comprising a floor panel which is mounted on and fixed in a nonpermanent manner to said front portions of said left and right cab frame members.

16. A construction for forming a body of an industrial vehicle, comprising;
a stationary cab frame structure,
a side panel serving as a side wall of a machine compartment of the vehicle, said side panel being mounted on said frame structure through side hinge means so that said side panel is swingable on a side hinge axis said side panel having a receiving portion, and
an upper panel serving as a top cover of said machine compartment, said upper panel being mounted on said frame structure through upper hinge means so that said upper panel is swingable on an upper hinge axis, said upper panel having a locking portion which engages with said receiving portion of said side panel in such a manner as to lock said side panel when said upper panel is closed in a state in which said side panel is closed.

17. A construction for forming a body of an industrial vehicle, comprising:
a cross member having an upper portion and two legs extending downwardly, respectively, from both ends of said upper portion,
left and right cab frame members which are connected rigidly with lower ends of said legs of said cross member, respectively, and
a covering for enclosing a machine compartment of the vehicle, said covering comprising a panel connected to said cross member.

18. A construction for forming a body of an industrial vehicle, comprising:
a stationary frame structure,
an upper panel serving as a top cover of a machine compartment of the vehicle, said upper panel being swingably mounted on said stationary frame structure through upper hinge means,
a first side panel serving as a side wall of the machine compartment, said side panel being swingably mounted on said stationary frame structure through first side hinge means which comprises at least one pair of a stationary leaf fixed to said stationary frame structure and a swingable leaf fixed to a bottom end of said side panel, wherein said first side hinge means includes means for removably detaching the first side panel from the stationary frame structure when said first side panel is rotated into a predetermined angular relationship with the stationary frame structure.

* * * * *

UNITED STATES PATENT AND TRADEMARK OFFICE
CERTIFICATE OF CORRECTION

PATENT NO.  :  4,770,263
DATED       :  September 13, 1988
INVENTOR(S) :  Sousuke Yoshioka It is certified that error appears in the above-identified patent and that said Letters Patent is hereby corrected as shown below:

On the Title Page, change

"[54] Body Constuction of Industrial Vehicle" to

--[54] Body Construction of Industrial Vehicle--.

Signed and Sealed this

Seventeenth Day of January, 1989

Attest:

DONALD J. QUIGG

*Attesting Officer*        *Commissioner of Patents and Trademarks*